(12) United States Patent
Boyce et al.

(10) Patent No.: US 6,398,382 B1
(45) Date of Patent: Jun. 4, 2002

(54) APPARATUS AND METHOD FOR INDICATING LIQUID LEVEL IN A CHEMICAL TANK

(75) Inventors: Allen R. Boyce, Portland, OR (US); Matthew J. Brinkman, Brush Prairie, WA (US)

(73) Assignee: SEH America, Inc., Vancouver, WA (US)

( * ) Notice: Subject to any disclaimer, the term of this patent is extended or adjusted under 35 U.S.C. 154(b) by 8 days.

(21) Appl. No.: 09/591,863

(22) Filed: Jun. 12, 2000

(51) Int. Cl.[7] ............................................. F21V 31/03
(52) U.S. Cl. ........................................ 362/101; 362/373
(58) Field of Search ........................... 362/96, 101, 294, 362/373, 562, 25, 502, 154; 73/293; 210/472

(56) References Cited

U.S. PATENT DOCUMENTS

| | | | | |
|---|---|---|---|---|
| 1,843,512 A | * | 2/1932 | Hutchison | 362/101 |
| 2,756,324 A | * | 7/1956 | Troik | 362/101 |
| 3,987,294 A | | 10/1976 | Carlson | 362/101 |
| 4,945,457 A | * | 7/1990 | Yazdani et al. | 362/96 |
| 4,993,457 A | | 2/1991 | Berfield | 137/899 |
| 5,144,545 A | * | 9/1992 | Klitzing | 362/101 |
| 5,178,450 A | * | 1/1993 | Zelensky et al. | 362/101 |
| 5,615,940 A | | 4/1997 | Barry | 362/72 |
| 5,634,706 A | | 6/1997 | Barry | 362/72 |
| 5,804,831 A | * | 9/1998 | Romatzick | 73/293 |
| 5,889,284 A | * | 3/1999 | Mattis | 73/293 |
| 6,039,460 A | * | 3/2000 | Ng et al. | 362/101 |
| 6,227,686 B1 | * | 5/2001 | Takahashi et al. | 362/345 |

FOREIGN PATENT DOCUMENTS

| | | | | |
|---|---|---|---|---|
| EP | 0188366 | * | 7/1986 | 362/96 |
| IT | 350602 | * | 2/1937 | 362/103 |

* cited by examiner

*Primary Examiner*—Sandra O'Shea
*Assistant Examiner*—Peggy A. Neils
(74) *Attorney, Agent, or Firm*—Douglas G. Anderson

(57) ABSTRACT

An illumination apparatus for indicating the liquid level in a chemical storage tank is provided. The apparatus includes a transparent globe surrounding a light bulb mounted by flanges to upper portions of a storage tank, and being illuminated by an external electrical supply. Optionally the light bulb may be cooled by either allowing gas or air contained in the storage tank pass through a hole in the globe to interact with and cool the light bulb, or supplying a gas to the globe and circulating it around the light bulb. A shadow line is cast at the surface level of the liquid in the tank, and can be visibly seen through the translucent walls of the tank from some distance away.

10 Claims, 3 Drawing Sheets

APPARATUS AND METHOD FOR INDICATING LIQUID LEVEL IN A CHEMICAL TANK

FIELD OF THE INVENTION

The present invention relates to an apparatus and method for demonstrating the liquid level in a translucent storage tank, and specifically to very large tanks used in commercial industry.

BACKGROUND OF THE INVENTION

Use of large volumes of water or other liquid chemicals is common in many industrial applications, including pharmaceutical, chemical production, and the semiconductor industry. In silicon wafer manufacturing, for example, it is common to use one million gallons of water or more each day. In these industries, it is very important to use very clean water, and therefore requires the use of reverse osmosis, deionization, or other purification techniques to prepare incoming water for manufacturing use. After the water has received one or more purification processes, the water is stored in very large tanks until its use is required. These tanks are typically made of fiber reinforced plastic, and are somewhat translucent. The tanks cannot be transparent, however, as biological growth would be induced.

With water consumption, there is considerable fluctuation in the volume of liquid in the tank at any given time. Typically, the liquid level of the tank is measured by a pressure transducer, and conveyed to an attached indicator. The percentage of liquid in the tank, or alternatively the inches of liquid in the tank, is shown on a dial indicator gauge, with calibration of the pressure transducer and indicator required on a periodic basis.

Liquid level alarms are tied into facilities management systems or process controllers to warn the facilities operator of a high level or low level condition. However, with such high water consumption, there is naturally a high flow through the tanks supply and discharge ports. This can result in the operator having very little time to respond to a high level or low level condition. In the absence of an alarm being activated, the operator must go to the dial indicator gauge to determine the fluid level in the tank. When multiple tanks are used, this compounds the situation, is time consuming, and inconvenient for the operator. Thus, there is a need for an operator to be able to determine the liquid volume in a tank quickly, and without having to travel to a specific instrument location on the tank and interpret the small dial indicator on the instrument.

SUMMARY OF THE INVENTION

The present invention addresses these and other shortcomings of the prior art by providing an apparatus and method that provides light into a translucent storage tank used to store high purity water or chemicals. The light provides a luminous glow in the area of the tank filled with air or other purge gas, with a shadow line being visible at the interface between liquid and air or purge gas. The shadow line is visible by an operator from anywhere in the facility where an unobstructed view to a fill-length vertical section of the tank is visible. Thus, the operator need not be proximate the tank in order to determine the approximate liquid volume in the tank. Moreover, the method and apparatus of the present invention provides a visual indication of liquid volume in the tank while maintaining the purity of the water or chemicals stored therein.

DETAILED DESCRIPTION OF THE INVENTION

Figure 1:
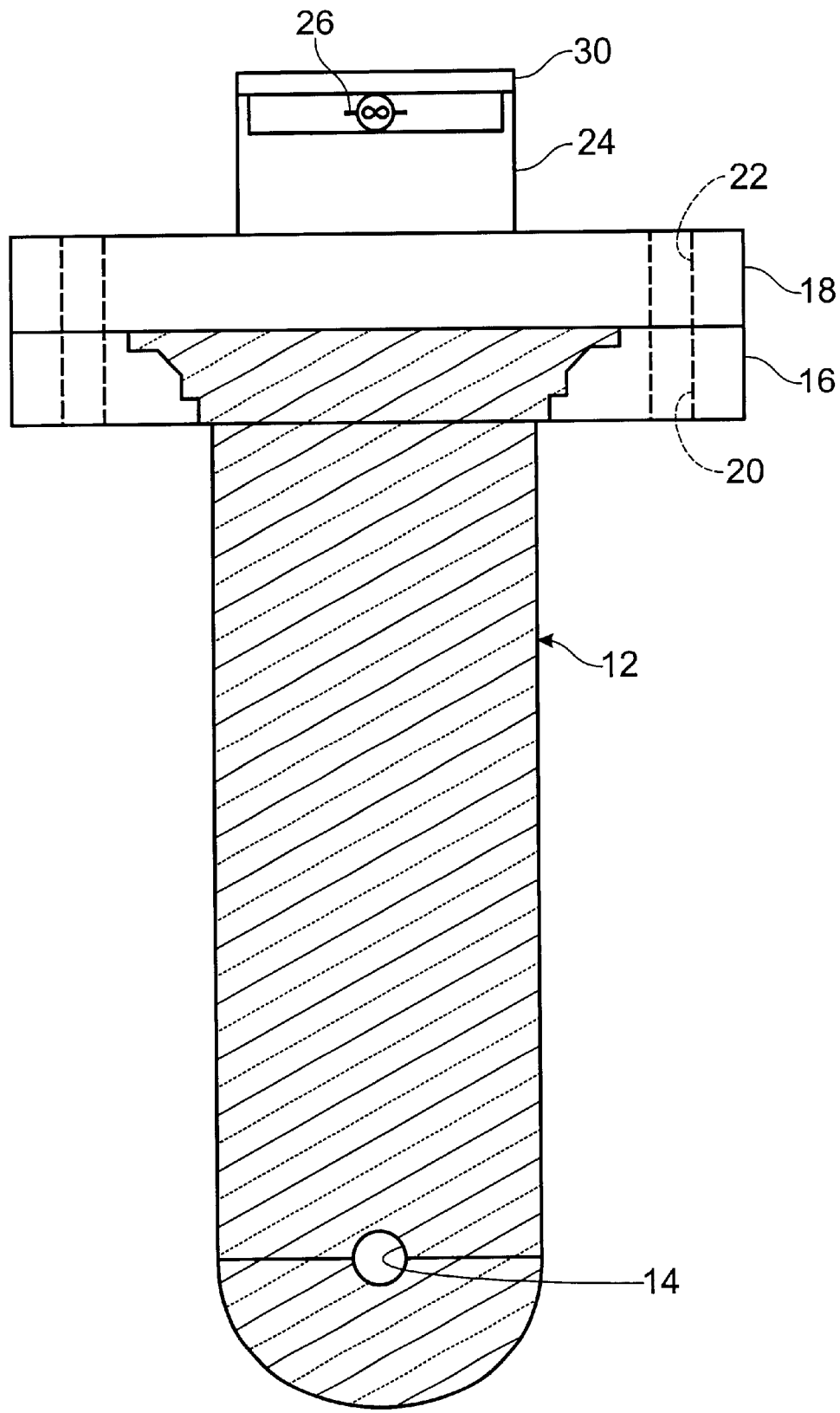
FIG. 1 is a cross sectional view of a flange and globe assembly of one embodiment of the present invention.

Turning now in detail to the drawings, FIG. 1 shows a light fixture apparatus. A clear globe 12 is made out of quartz, plastic, LEXAN™, or other transparent material. The globe 12 is mounted to a wall of the tank so as to extend through the wall and into the interior of the tank. More particularly, the globe is typically mounted to and extends through the wall of an upper portion of the tank that is above the anticipated maximum level of the liquid to be stored by the tank. For example, the globe is typically mounted to and extends through the wall of the top of the tank. In one embodiment, globe 12 includes a flair that interacts with, and is supported by a slip flange 16. The slip flange, in turn is mounted to the wall of the tank, such as the top of the tank, as described below. In a preferred embodiment, the globe 12 defines one or more holes 14 in the end opposite the flair to allow air or purge gas within the tank to be evacuated through the globe 12 to remove and dissipate heat generated by the apparatus. In an alternative embodiment, a small pipe (not shown) extending through the globe 12 at the end opposite the flair could be used to supply purge gas and dissipate heat.

Slip flange 16 is mounted to an outer wall of the tank (not shown) to be illuminated by the present apparatus, wherein the tank has a tank flange (not shown) that mates with slip flange 16. The slip flange 16 is secured to the tank flange by a number of bolts, screws, or the like, through mounting holes 20 and 22. The slip flange is therefore connected to an outer wall of the tank, typically by means of a tank flange, while the glove extends through an opening in the wall of the tank so as to be primarily disposed within the tank. A blind flange 18 is then mounted on the top of the slip flange 16 on the outside of the tank with mounting hardware such as bolts or the like, through mounting holes 22. When the blind flange 18 is mounted to the slip flange 16, the globe 12 is prevented from coming out of the slip flange 16, but the globe 12 can still rotate around its longitudinal axis within the slip flange 16. An electrical box 24 is then mounted on the blind flange 18, also on the outside of the tank.

Figure 3:
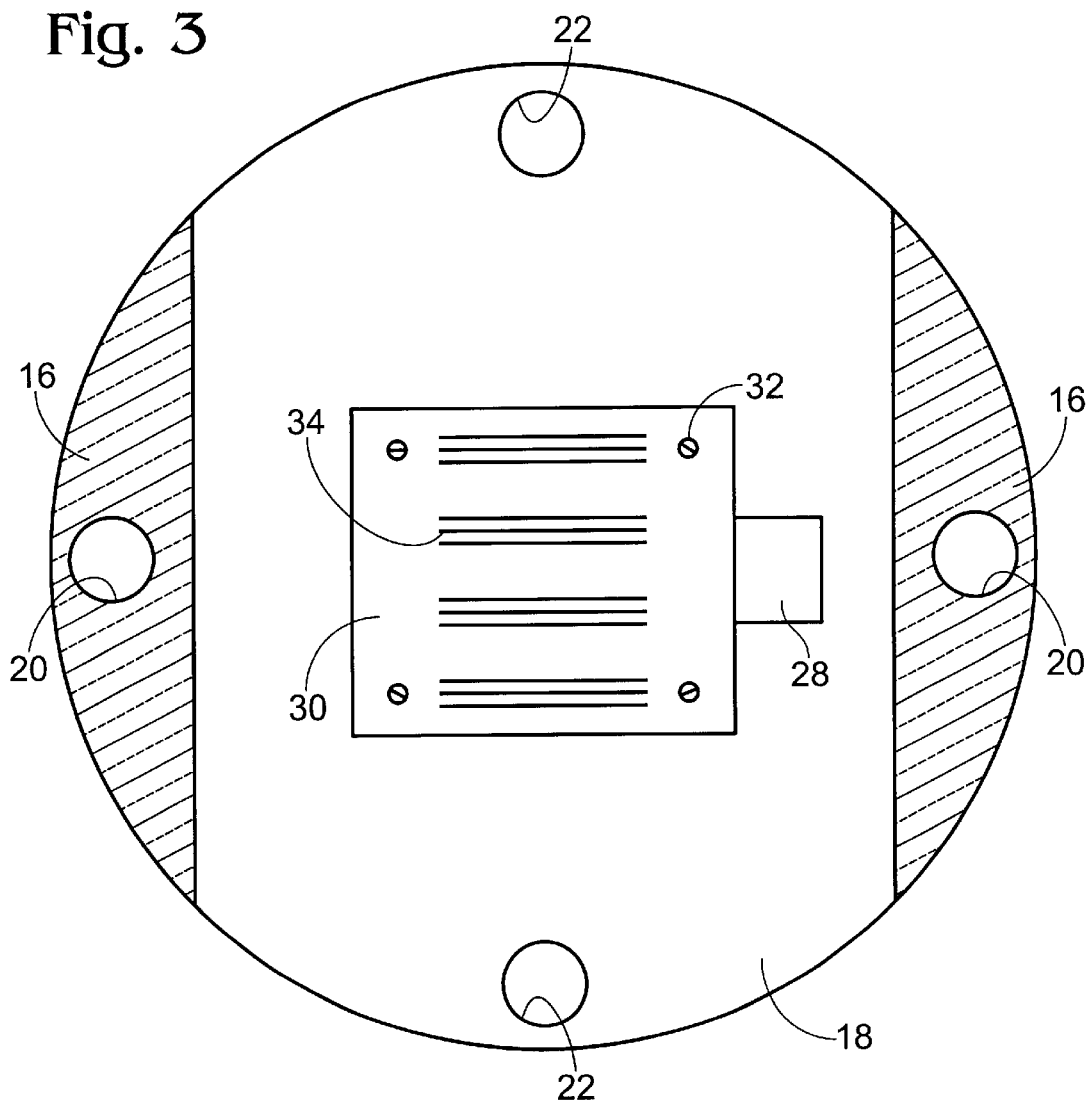
FIG. 3 is a top view of a flange assembly of one embodiment of the present invention, in the same orientation as FIG. 2.

As shown in FIG. 3, the blind flange 18 mounts to the slip flange 16 through mounting holes 22, but is trimmed such that it does not overlie and mount to the remaining mounting holes 20 in the slip flange 16. This allows the blind flange 18 to be removed, allowing for maintenance of the apparatus, without having to expose the contents of the tank to the environment outside the tank since the slip flange will remain connected to the tank by the bolts extending through mounting holes 20. The electrical box 24 has a lid 30 that is removably attached by screws 32 or other removable/reattachable fasteners. Lid 30 has a plurality of vent slots 34 cut into it, allowing for air or another purge gas to be circulated through the apparatus and evacuated. The electrical box 24 also has a threaded conduit hub 28, allowing an electrical cord (not shown) to be supplied to the inside of the electrical box 24.

Figure 2:
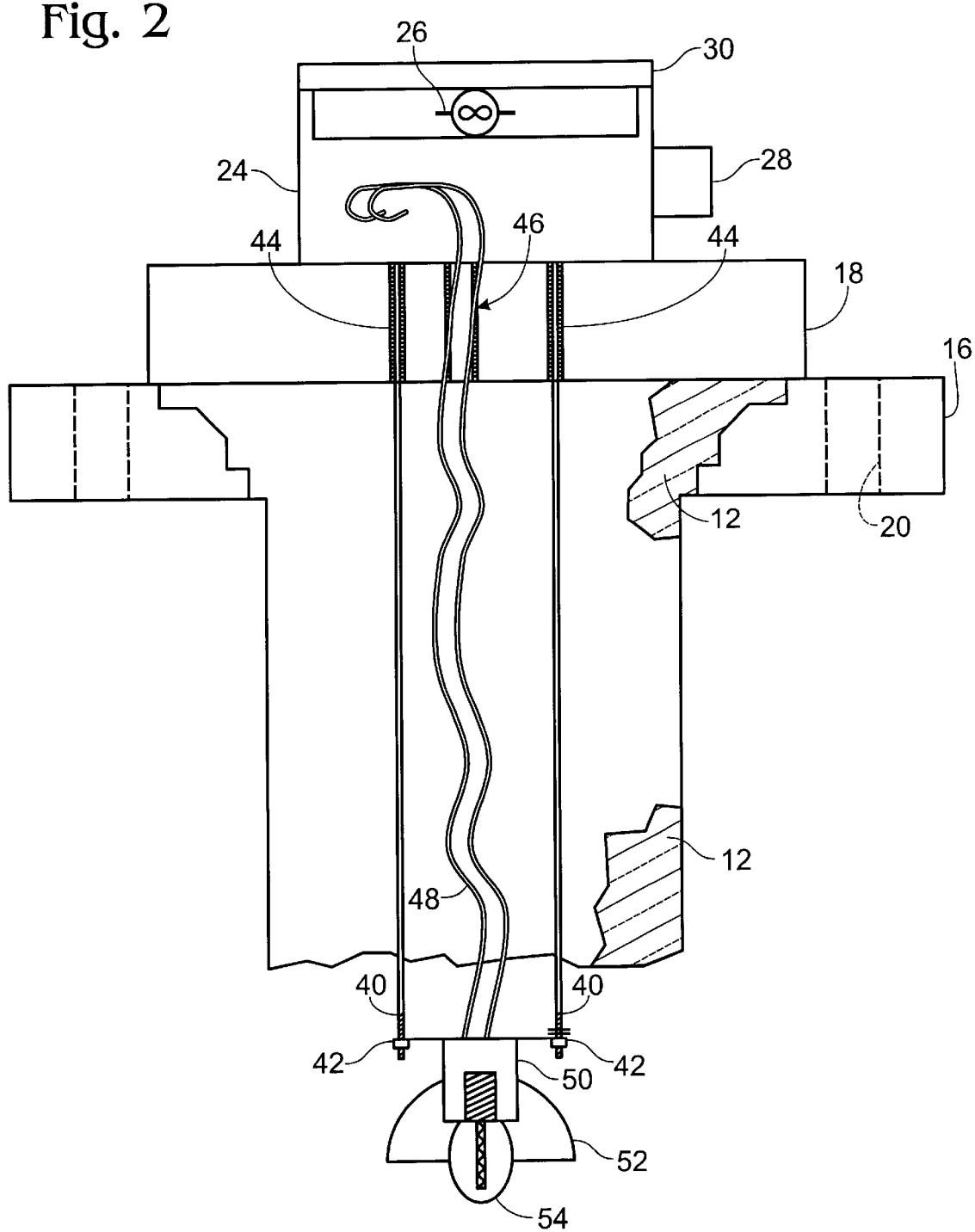
FIG. 2 is a cross sectional view of a light source of one embodiment of the present invention, rotated 90 degrees from FIG. 1.

FIG. 2 illustrates the illumination apparatus housed within the globe 12. One or more fixture mounts 40 are attached at one end to the blind flange 18. In one preferred embodiment, the fixture mounts 40 are threaded and screwed into the blind flange 18, but any method of securely mounting is appropriate. The fixture mounts 40 extend away from the blind flange 18, and when fully assembled, into the globe 12. At the end of the fixture mounts 40 opposite the blind flange 18 a light fixture 50 is then mounted by nuts 42, or other removable means. The light fixture 50 preferably has a semi-spherical reflector 52. Since the globe is typically mounted at the top of the tank and extends down into the tank, the reflector serves to reflect light downward into the tank. The reflector 52 must be small enough in diameter to fit into the globe 12, and still allow the flow of air or another purge gas to pass the upward around the reflector and toward the electrical box 24 so that heat can be dissipated. A light bulb 54 is placed in the light fixture 50, and must be of sufficient power and lumens to illuminate the tank. Electrical power is supplied to the light fixture by electrical cord 48 which runs from the electrical box 24 through a wire chase 46 in the blind flange 18, and down to the light fixture 50. The wire chase 46 is of sufficient diameter to allow the electrical cord 48 to freely move and provide passage of air or another purge gas from the area surrounding the light bulb 54 through the wire chase 46 and up into the electrical box 24.

Finally, an electric fan 26 is mounted in the electrical box 24, such that the fan pulls air or another purge gas from the area around the light bulb 54, and vents it through the vent slots 34 cut into the lid 30 to dissipate heat and provide circulation.

The present invention will be further clarified by consideration of the following example, which is intended to be purely exemplary of the invention.

EXAMPLE

A mounting flange was put in the top of a fiber reinforced plastic 40,000 gallon tank 38 feet tall, 14 feet in diameter, and having a wall thickness of approximately 0.25 inch. The tank was filled with de-ionized water. The tank was equipped with supply and feed lines for transfer of the water, as well as a supply line and vent for a purge gas. A globe two inches in diameter and seven inches long was fixed in the tank, with a 250 watt halogen light used for the illumination source. Power was supplied to the light, and the tank was filled to various levels of water. The shadow line, indicating the level of liquid in the tank, was clearly visible at a distance of over 100 feet for all tank volumes between the tank high volume and low volume alarm indicators, such that an operator could monitor the liquid level remotely without having to be proximate to the tank.

It should be understood that tank wall thickness, translucency of the tank wall, lumens produced by the light source, transparency of the globe, placement of the lighting apparatus and the like can all effect visibility of the shadow line. It is intended that optimization of these parameters be considered as embodiments found within the present invention. It is intended that the specification and example be considered in all aspects only as illustrative and not restrictive. The scope of the invention is, therefore, indicated by the appended claims rather than by the foregoing description. All changes which come within the meaning and range of the equivalence of the claims are to be embraced within their scope.

What is claimed is:

1. A lighting apparatus for illuminating a translucent liquid-storing tank, comprising:

a slip flange for mounting to a tank;

a hollow globe, mounted to said slip flange and disposed within said tank, said globe having a flair at one end to interact with said slip flange;

a light bulb disposed within the hollow globe, and being illuminated by an external electrical source; and an electrical supply box, operably connected to said slip flange, for supplying said external electrical source, said electrical supply box defining at least one ventilation opening.

2. A lighting apparatus according to claim 1, further comprising a fan to circulate gas surrounding said light bulb.

3. A lighting apparatus according to claim 1, wherein said globe defines at least one hole through which gas from said tank is allowed to pass to interact with and cool said light bulb.

4. A lighting apparatus according to claim 1, further comprising a gas feed tube wherein said gas is supplied to the globe and is allowed to interact with and cool said light bulb.

5. An illuminated tank for containing liquids, comprising;

a translucent tank made of fiber reinforced plastic containing having a top, a cylindrical body, and a bottom;

a flange on the top of said tank, wherein a portion of the top of the tank within the flange defines an opening for allowing access into the tank;

supply and feed lines for getting liquid into and out of the tank;

a gas inlet for allowing gas flow to maintain tank pressure;

a slip flange mating to said flange;

a hollow globe placed inside the tank and secured to said slip flange; and a light source placed within said hollow globe to provide illumination into said tank.

6. The illuminated tank according to claim 5, wherein said globe defines at least one hole through which gas from said tank is allowed to pass to interact with and cool said light bulb.

7. The illuminated tank according to claim 5, wherein a gas is supplied to said globe, and allowed to interact with and cool said light bulb.

8. The illuminated tank according to claim 5, further comprising a fan to cool said light bulb.

9. The illuminated tank according to claim 5, wherein said globe is a transparent quartz globe.

10. The illuminated tank according to claim 5, wherein said globe is a transparent plastic globe.

* * * * *